…

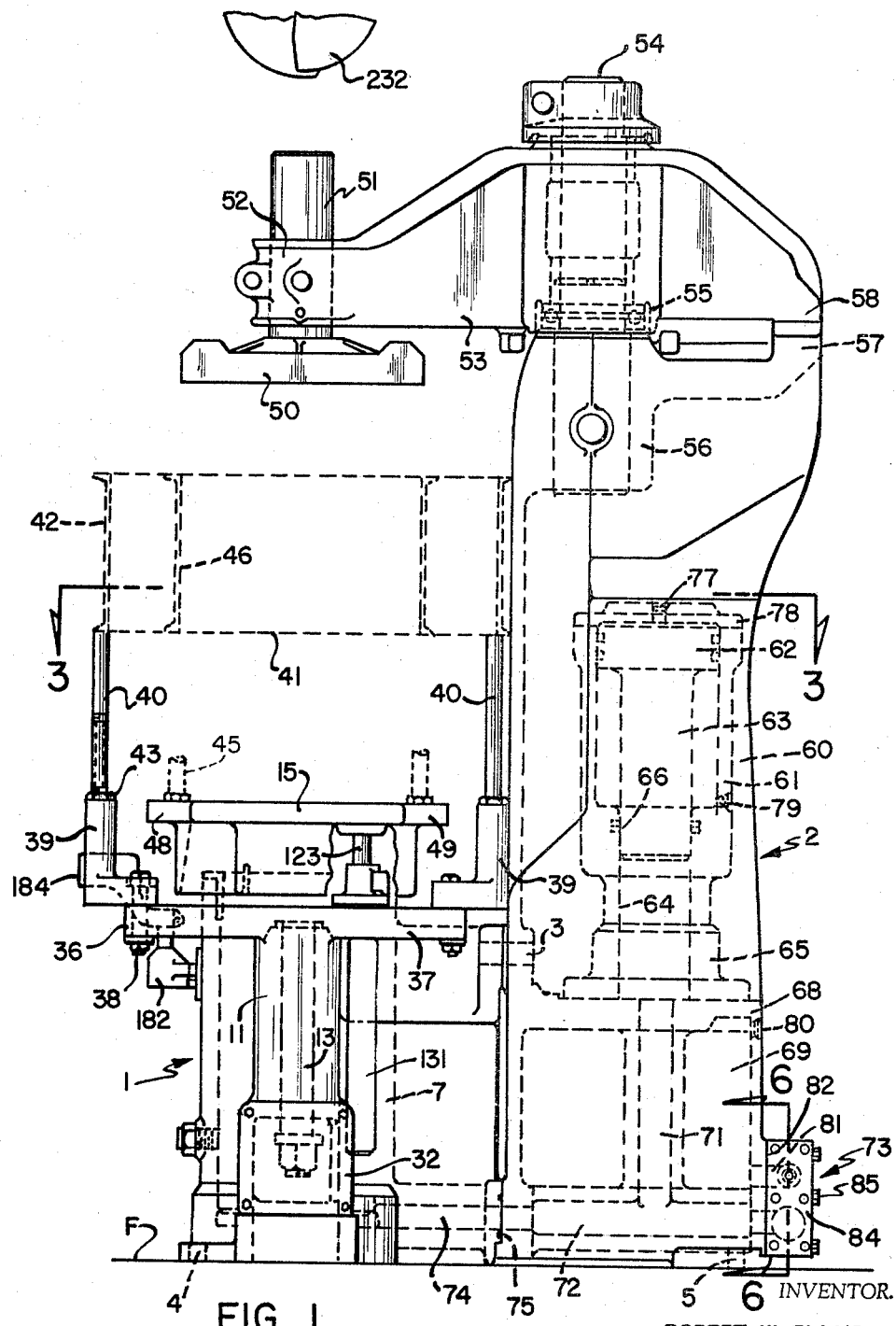
FIG_1

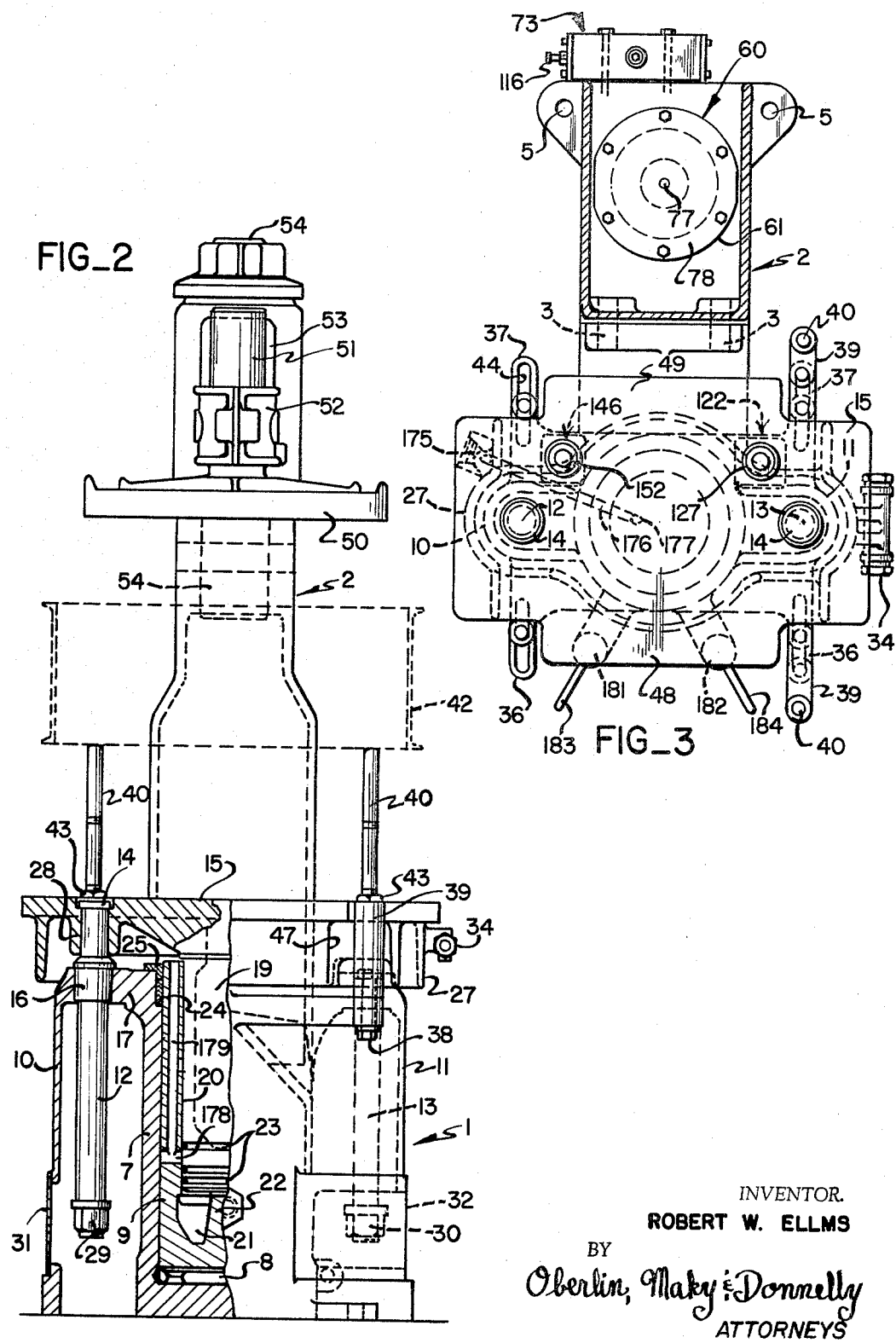

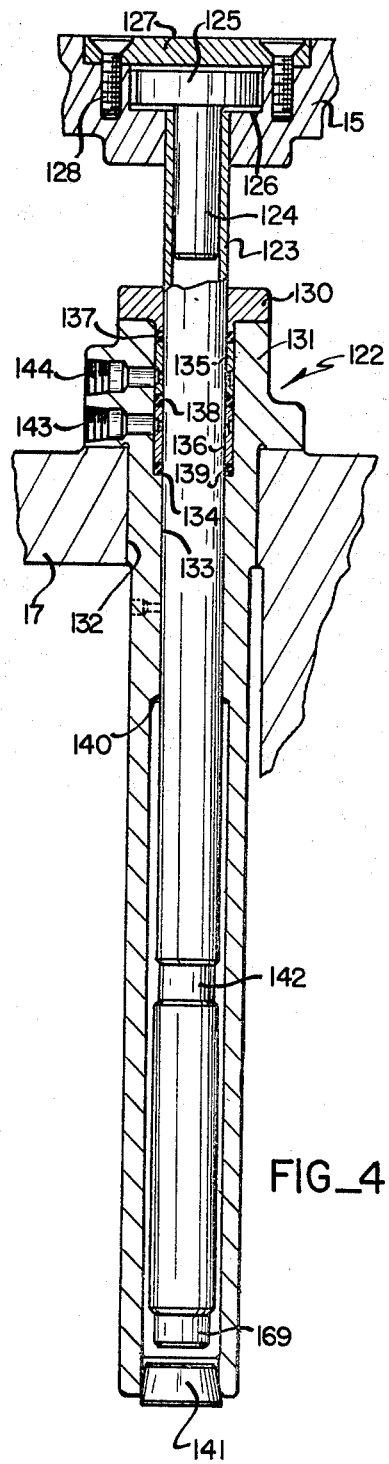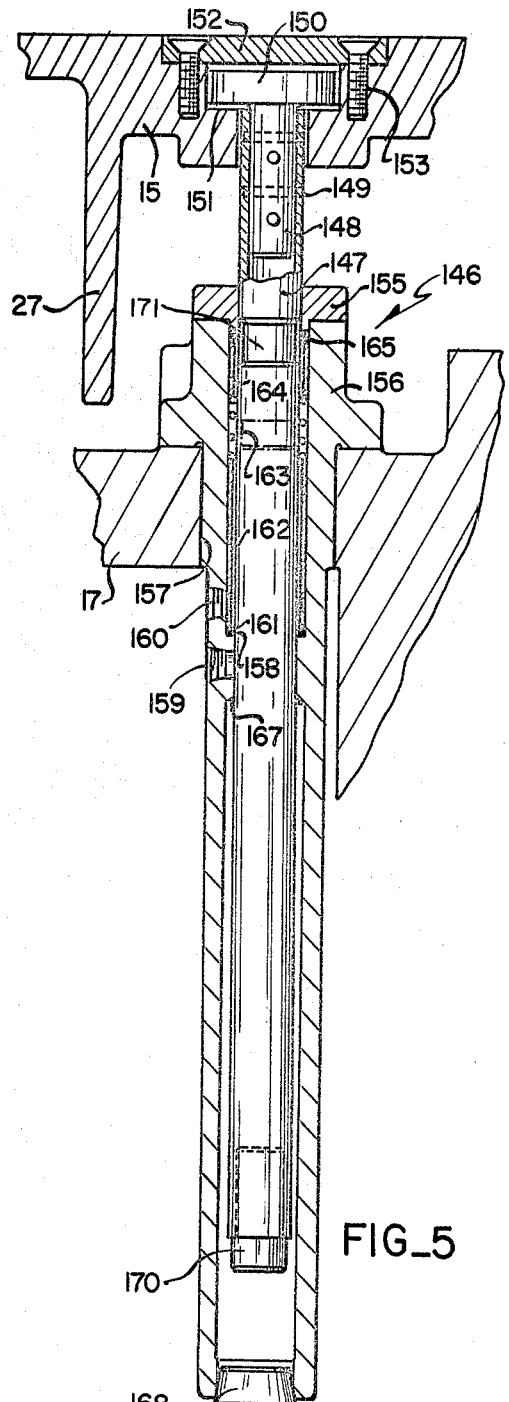

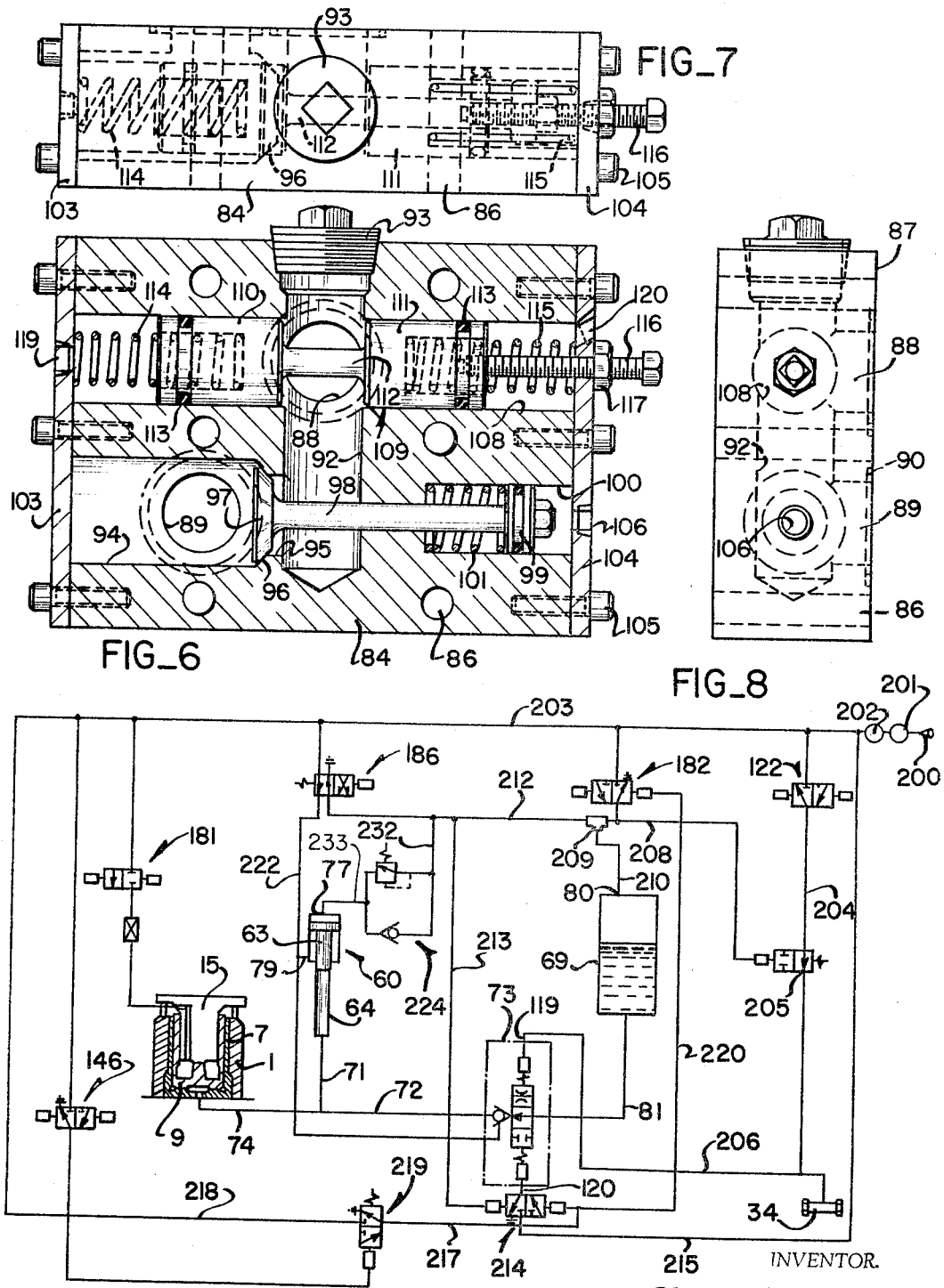

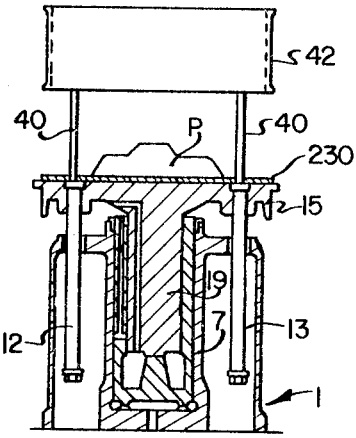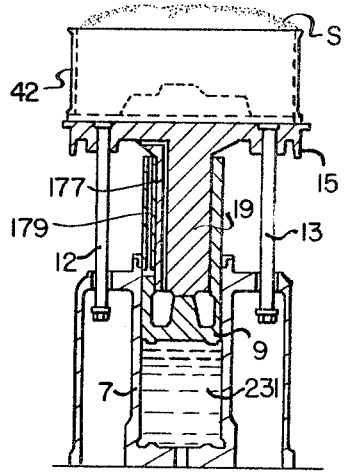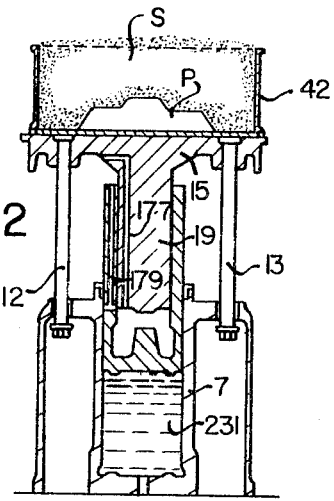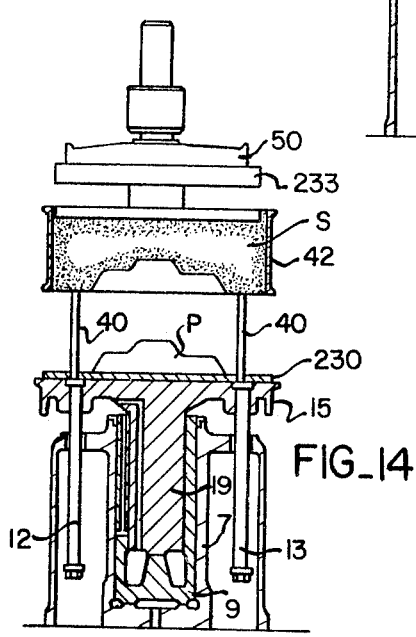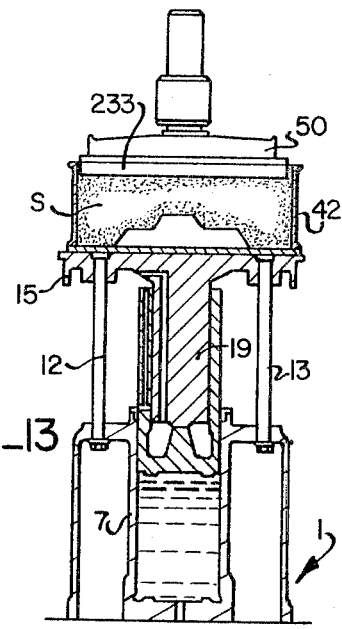

United States Patent Office 3,267,528
Patented August 23, 1966

3,267,528
FOUNDRY MOLDING MACHINE
Robert W. Ellms, North Olmsted, Ohio, assignor to The Osborn Manufacturing Company, Cleveland, Ohio, a corporation of Ohio
Filed Nov. 5, 1963, Ser. No. 321,514
19 Claims. (Cl. 22—42)

This invention relates generally as indicated to a foundry molding machine and more particularly to certain improvements in smaller molding machines enabling the same to embody a jolt-on-oil mode of operation similar to that disclosed in the copending application of Leon F. Miller et al., Serial No. 252,644, now Patent 3,205,542, filed January 21, 1963 for "Molding Machine."

In such aforementioned copending application, there is disclosed a relatively large capacity molding machine which utilizes a single stroke of a hydraulic piston-cylinder assembly to facilitate assembling of a pattern, pattern plate and flask, the filling of such flask with sand, the jolting of the sand filled flask, the squeezing of the sand within the flask, and the subsequent drawing of the pattern from the sand mold thus produced. It has been found desirable to utilize such a principle and mode of operation in smaller, less expensive machines. Large capacity machines generally have very complex control panels with a maze of air and oil lines interconnecting the operating valves and the various components on the machine. Such a construction would, of course, be completely unfeasible for smaller less expensive machines both because of cost and space problems involved. Moreover, such smaller less expensive machines are generally manually operated rather than part of automated lines and the controls therefor should necessarily be of a simplified nature.

It is accordingly a principal object of the present invention to provide a smaller less expensive foundry molding machine incorporating the principle and mode of operation of the large capacity molding machine illustrated in the aforementioned copending application of Leon F. Miller et al., Serial No. 252,644, now Patent 3,205,542, filed January 21, 1963 entitled "Molding Machine."

Another principal object is the provision of a foundry molding machine having a simplified control system.

Still another principal object is the provision of a smaller capacity simplified manually operated molding machine which is yet capable of developing extremely high molding squeeze pressures.

Another object is the provision of a small capacity compact foundry molding machine having unique jolt and draw control valves.

A further object is the provision of such machine utilizing a jolt-on-oil mode of operation having an air operated intensifier which may be incorporated directly in the machine.

A yet further object is the provision of a foundry molding machine having a unique master control valve interlocked with the intensifier and also incorporated directly in the machine.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation partially broken away of a foundry molding machine in accordance with the present invention;

FIG. 2 is a front elevation of such machine partially broken away and in section as seen from the left in FIG. 1;

FIG. 3 is a horizontal section of such machine taken substantially on the line 3—3 of FIG. 1;

FIG. 4 is an enlarged fragmentary vertical section of the slow draw and vibrator actuator valve;

FIG. 5 is a similar view of the jolt height stop actuator valve;

FIG. 6 is an enlarged vertical section of the master control valve taken substantially on the line 6—6 of FIG. 1;

FIG. 7 is a top plan view of such control valve;

FIG. 8 is an end elevation of such control valve as seen from the right in FIGS. 6 and 7;

FIG. 9 is a schematic pneumatic and hydraulic piping diagram of the control system of the machine of the present invention; and FIGS. 10 through 14 are schematic sectional views of the machine illustrating various steps in a complete cycle of operation.

Referring now to the annexed drawings and more particularly to FIGS. 1 to 3, it will be seen that the illustrated machine comprises a front or table base frame 1 securely joined to a rear or upright squeeze head pedestal frame 2 by means of suitable fasteners passing through apertures such as those indicated at 3. Both frames 1 and 2 may be secured to the floor F by fasteners passing through apertures 4 and 5 in the respective frames.

The table base frame 1 may comprise a central cylindrical portion 7 having a cylindrical cavity 8 therein receiving vertically movable squeeze piston 9 and two laterally extending portions 10 and 11 which house therein vertically extending and movable guide pins 12 and 13, respectively. The tops 14 of the guide pins 12 and 13 are secured in a recessed manner to a table 15 and extend downwardly through bushings 16 in the top 17 of the table base frame 1.

The table 15 is mounted on a vertically extending piston 19 which is received within a cylindrical cavity 20 in the squeeze piston 9. The bottom of the cavity 20 is provided with an annular chamber 21 which surrounds a frusto-conical projection 22, the top of which is adapted to engage the bottom of the piston 19 to provide a jolt striking surface between the hollow squeeze piston 9 and the table supporting jolt piston 19. Suitable sliding seal rings 23 are provided in the jolt piston 19 to obtain the desired air seal between the piston and the squeeze cylinder while chevron packings 24 held in place by ring 25 may be provided between the top of the cylindrical center portion 7 of the frame 1 and the exterior of the squeeze piston 9.

The table 15 may be provided with a peripheral skirt 27 which telescopes to a slight extent over the top of the base frame 1. The table 15 is also provided with hub portions 28 accommodating the guide pins 12 and 13, the bottoms of which are provided with stop nuts 29 and 30, respectively. Access plates 31 and 32 are provided in the laterally extending portions 10 and 11 of the frame 1 so that the stop nuts may be removed from the guide pins and vertically adjusted so that the table 15 may be removed or so that the vertical maximum height thereof can be adjusted. It will now be seen that fluid pressure applied to the cylindrical cavity 8 in the central cylindrical portion 7 will cause the squeeze piston 9 to rise carrying therewith the piston 19 which supports the table 15. Vertical movement of the table will cause the guide pins 12 and 13 to move upwardly through the bushings 16 with the stop nuts 29 and 30 limiting such upward movement.

A pattern vibrator 34 is mounted on the skirt 27 of the table 15 to facilitate the drawing of the pattern from the finished mold.

Projecting front and back, respectively, from each of the lateral projections 10 and 11 are slotted arms 36 and 37 to which are secured by suitable fasteners 38 L-shaped flask end supporting brackets 39 which vertically adjustably support flask pins 40 adapted to engage the underside 41 of flask 42, shown in dotted lines in FIGS. 1 and 2. By adjusting the nuts 43 at the top of each bracket, the vertical extent of the pins 40 may readily be controlled. By loosening the nut and bolt assemblies 38 holding the L-shaped brackets 39 to the arms 36 and 37, the position of such brackets may be adjusted along the slots 44 therein thus to enable movement of the flask support pins from the dotted line position indicated at 45 to the full line position shown in FIG. 1. Accordingly, smaller flasks such as indicated at 46 may readily be supported on the pins 40 by a simple adjustment of the fasteners 38 and movement of the brackets 39 along the respective slots. The skirt 27 of the table 15 may be recessed as indicated at 47 to provide access to the fasteners and the table 15 may be provided with front and back extensions 48 and 49, respectively, which provide corner recesses accommodating the flask support pins 40 for such front and back adjustment.

The flask 42 or 46 will normally be provided with recesses in the bottom edge thereof to facilitate the operator placing the flask on the supporting pins 40. It will, however, be appreciated that other types of flask supports may be provided. For example, a roller conveyor having suitable stops may be employed more automatically to position and support the flasks in the machine.

A squeeze head 50 of generally rectangular configuration is mounted at the lower end of a post 51 vertically adjustably secured in hub 52 on the distal end of a pivot arm 53. The arm 53 is vertically pivotally mounted on pin 54 through thrust bearing 55, such pin 54 being mounted and secured in internal hub 56 at the upper end of the pedestal frame 2. A rearward extension 57 on the hub underlies a projection 58 at the rear of the arm 53 providing a contact surface between the frame and arm to reduce the slewing load on the bearing 55 during the squeezing operation. The arm 53 and thus the head 50 is then mounted for swinging movement about the axis of the pin 54 so that the head may be moved laterally out of the way to permit the flask to be filled with sand from an overhead hopper, chute, or the like. A squeeze board may be secured to the underside of the head 50 of a size and peripheral configuration depending on the size of the flask employed.

As indicated more clearly in FIG. 2, the squeeze head frame 2 is of channel shape configuration and houses therewithin an air operated oil pressure intensifier 60 which comprises a cylinder 61 having a stepped piston 62 therein, the rod or ram portion 63 of which projects downwardly into bore 64 in the annular support pedestal 65 for such cylinder 61. Chevron packings 66 provide the proper sliding seal for the rod 63 within the bore 64.

The pedestal 65 is mounted on the top of oil reservoir housing 68 which includes an annular oil chamber 69 therein. A vertically extending bore 71 of substantial diameter extends through the annular oil chamber 69 and communicates the somewhat larger bore 64 with a horizontally extending bore 72 in the frame 2 beneath the reservoir housing 68. The horizontal bore 72 extends from master control valve 73 which is secured to the exterior of the housing 68 to aligned horizontal bore 74 in the table base frame 1 which is in fluid communication with the bottom of the chamber 8 beneath the squeeze piston 9. A seal ring 75 may be provided between the two frames where the bores 72 and 74 join.

A tapped aperture 77 may be provided in the cover 78 of the cylinder 61 whereby an air line may be connected to the top of the cylinder. A similar tapped aperture may be provided at 79 in the wall of the cylinder 61 also for connection of an air line. Likewise, a tapped aperture 80 is provided at the top of the annular oil chamber 69 so that an air-over-oil reservoir is in effect provided by the chamber 69. Air supplied through the inlet 77 to the top of the cylinder 61 will then force the piston 62 downwardly and thus the ram 63 into the bore 64 reducing the volume thereof and thus intensifying the pressure of any oil therein. Similarly, suitable oil pressure will be supplied by air pressure through the inlet 80 on the top of the oil body within the chamber 69.

An oil passage 81 near the bottom of the oil chamber 69 provides direct communication between the chamber 69 and the master control valve 73. The housing 68 may be provided with a finished surface 82 to which is secured master valve block 84 by suitable fasteners 85 passing therethrough. As seen more clearly in FIGS. 6 through 8, such block 84 is provided with apertures 86 to accommodate such fasteners. The inner face 87 of the block which abuts against the finished face 82 of the housing 68 is provided with vertically offset passages 88 and 89 communicating with the passages 81 and 72, respectively, in the reservoir housing 68 of the frame 2. Each passage 88 and 89 may be surrounded by an annular groove as indicated at 90 to receive an O-ring for sealing the interface between the block and housing.

The passageway 88 is vertically centered in the block 84 and intersects a vertical passage 92, the top of which is closed by plug 93. The passage 89 intersects a horizontal passage 94 which joins the bottom of vertical passage 92 through reduced diameter aperture 95. Such reduced diameter aperture forms a valve seat 96 for valve member 97, the stem 98 of which is connected to piston 99 within cylindrical bore 100. A compression spring 101 is situated between the inner end of the bore and the piston to maintain the head 97 against the seat 96 and the valve thus closed.

Normal oil flow through the valve will then be through the passage 88, the vertical passage 92, through the reduced diameter portion 95 into the passage 94 and out through passage 89, when the table 15 is being elevated. When the table is being lowered, the reverse flow will obtain. The ends of the block 84 are provided with cover plates 103 and 104 which may be held to the block by suitable fasteners indicated at 105. The plate 104 is provided with a tapped aperture 106 for connection of an air line to provide air pressure to the cylindrical bore 100 to move piston 99 against the pressure of spring 101 to cause the check valve to unseat.

The valve body 84 is also provided with a horizontal bore 108 which intersects the vertical passage 92 as well as the horizontal passage 88. Situated within such bore 108 is a valve spool 109 having two lands 110 and 111 interconnected by a grooved portion 112 which has a relatively small diameter compared to the diameter of the lands 110 and 111. For example, in the illustrated embodiment, the diameter of the lands may be 1⅝ inches whereas the diameter of the grooved portion is ½ inch. Sealing rings 113 are provided in each land and each land is also recessed to receive compression springs 114 and 115 extending between the plates 103 and 104 and the lands 110 and 111, respectively. Threaded into the plate 104 coaxially with the bore 108 is a stop screw 116 having a lock nut 117 thereon which limits movement of the spool 109 to the right as viewed in FIG. 6. Apertures 119 and 120 are provided in the plates 103 and 104, respectively, so that air lines may be connected thereto to pressurize the bore 108 on each side of the spool 109. Accordingly, when air pressure is supplied through the inlet 119, the spool 109 will move to the right as viewed in FIG. 6 until the spool engages the stop screw 116. In such position, depending upon the setting of the screw, oil flow from the passage 88 to the passage 92 will be substantially restricted. Conversely, when the bore 108 is vented through aperture 119 and pressurized through aperture 120, the spool 109 will move to the left as seen in FIG. 6 and since no stop screw is provided, the passage 92 will effectively be blocked by the land 111.

It can now be seen that the master control valve comprises two separate valves, namely an air operated check valve in the main oil passage as well as a three position spool valve operated by air at either end whereby the main oil passage may be opened, partially blocked, or completely blocked.

Referring now to FIG. 4, there is illustrated in detail the slow draw and vibrator actuator valve 122 which operates in response to table height. Such valve includes a vertically extending tubular member 123, the upper end of which is secured to rod 124 having cylindrical head 125 thereon which fits within recess 126 in the table 15, the top of which is covered by annular plate 127 secured to the table 15 by suitable fasteners 128. The tubular rod or valve member 123 is thus secured at its top to the table 15 for vertical movement therewith. Such member extends downwardly from the table through hub or packing retainer 130 mounted on the top of valve housing 131 which is mounted in aperture 132 in the top 17 of the base frame 1. The housing 131 includes an elongated central bore 133 having a shoulder 134 with apertured sleeves 135 and 136 being situated in the enlarged bore provided by the shoulder between the shoulder and the retainer 130. Seals 137, 138 and 139 are provided surrounding the valve member 123 between the retainer, sleeve 135, sleeve 136, and shoulder 134, respectively. The bore 133 is also provided with an enlargement 140 which terminates in a threaded portion closed by plug 141 at the very bottom of the valve housing. The valve member 123 is provided with a groove 142 which will provide air communication between tapped inlet 143 and tapped outlet 144 when the valve stem 123 is in the proper vertical position. Accordingly, the height of the stem 123 obtained by movement of the table will cause the valve 122 to open to obtain slow draw and vibrator actuation. The sleeves 135 and 136 may have a clearance with the stem 123 and the further upward movement of the stem will vent the outlet 144 around the top seal resetting the actuated valve.

The jolt height stop actuator valve 146 is of similar construction as seen in FIG. 5. A vertically extending tubular valve member 147 is secured to rod 148 by the pin fasteners 149 as indicated and such rod has a head 150 thereon confined in recess 151 in the table 15 by cover plate 152 held to the table by suitable fasteners 153. The valve member 147 extends downwardly through seal retainer 155 and through aligned valve housing 156 mounted in aperture 157 in the top 17 of the base frame 1. The valve housing is provided with a shoulder 158 between tapped inlet 159 and outlet 160 in the valve housing. A seal 161 is seated on such shoulder and an apertured sleeve 162 is seated on such seal. A compression spring 163 is seated on top of the sleeve 162 and a further sleeve 164 is situated between the compression spring and the seal 165 held by the retainer 155. The spring 163 thus axially separates the sleeve 162 and 164 maintaining them in engagement with the top and bottom seals 165 and 162, respectively. Such sleeves also have a certain clearance with respect to the valve member 147.

The valve housing 156 is interiorly recessed as indicated at 167 and the bore thus provided is threaded and plugged as indicated at 168 at the bottom of the housing. It is noted that the valve member 147 is somewhat shorter than the valve member 123 of the slow draw and vibrator actuator valve 122 and both valve members are provided with bottom plugs of somewhat reduced diameter as indicated at 169 and 170. The valve member 147 is also provided with a reduced diameter or groove portion 171 which will function to by-pass the top seal 165 to vent the port 160 when the valve member is in the full line position shown. In the valve 122, the grooved portion 142 as it moves outwardly will also serve to by-pass the top seal 137 venting the port 144 in the maximum up position thereof.

It is now believed apparent that the valves 122 and 146 which operate in response to the vertical height of the table will selectively open and close air communication between the inlet ports and outlet ports thereof as hereinafter more fully described in connection with the operation of the machine.

With reference to FIG. 3, it will be seen that jolt air is supplied to the table 15 through lateral inlet 175 which communicates with horizontal passage 176 and then vertical passage 177 passing downwardly through the jolt piston 19 supporting the table. Such passage 177 terminates in the bottom of the piston communicating jolt air pressure with the annular cavity or bottom 21 of the cylindrical recess 20. The cylindrical wall of the squeeze piston 9 is provided with a series of ports 178 which communicate with vertical passages 179 in the wall of the squeeze piston and exhaust to atmosphere at the top thereof as seen in FIG. 2. Thus jolt air pressure applied to the inlet 175 will cause the jolt piston to rise until the exhaust ports 178 are uncovered and the table and piston will then descend by gravity causing a jolt strike between the conical projection 22 and the bottom of the jolt piston 19. This will continue until the jolt action is complete.

Also as seen in FIG. 3, the front of the machine is provided with a jolt valve 181 and a raise and draw valve 182 which may be operated by handles 183 and 184, respectively. The operator will thus have convenient access to these two operating valves. These valves are also shown in FIG. 9. The squeeze valve 186 shown in FIG. 9 is also manually operated and may be controlled by a lever mounted on the swinging head supporting arm 53 and the valve itself may be mounted on the side of the squeeze head frame 2. The three major control valves may be conveniently accessible to the operator. The valves 122 and 146 as well as the master control valves 73 are mounted directly in the machine.

*Operation*

Referring now more particularly to the schematic control diagram FIG. 9 and the more schematic sequence views FIGS. 10 through 14, the operation of the machine is believed apparent. Referring first to FIG. 9, a suitable source of air pressure 200 may be provided which can readily be connected to a plant air source and such passing through filter 201 and lubricator 202 enters main air pressure line 203. From this main pressure line 203, branch lines connect each of the valves 122, 182, 186, 181, and 146. From the valve 122, line 204 passes through an air operated shut-off valve 205 to line 206 which is connected at one end to the vibrator 34 and at the opposite end to the port 119 of the master control valve 73. The outlet of the table raise valve 182 is connected to line 208 which is connected at one end to the air operated shut-off valve 205, to a directional valve 209 having an outlet 210 connected to the port 80 on the top of the reservoir 69. Another outlet line 212 of the directional valve 209 is provided with a branch 213 connected to one end of three-way air operated valve 214 mounted in pressure line 215 which extends from the source line 203 to the opposite port 120 of the master control valve 73. The opposite end of the valve 214 is pressurized through line 217 from line 218 connected to the main pressure line 203 by means of a pressure action valve 219. The pressure action valve 219 is controlled by means of the jolt height stop actuator valve 146. A branch line 220 is connected to the line 217 and also to the opposite end of the manually operated raise table valve 182 for return of the same.

The squeeze valve 186 is a manually operated four-way valve which will supply air pressure to and vent lines 212 and 222, the latter being connected to port 79 at the rod end of the intensifier cylinder 60 and also serving as the pilot line for the pilot operated check valve in the master control valve 73. The port 77 at the blind end of the intensifier cylinder 60 is connected to line 223 in turn connected to the line 212 through a spring loaded sequence valve 224, the spring pressure of which will normally hold the valve closed. It is here noted that the various valves in the control mechanism of the machine are either all manually operated or air operated and that no complex electrical wiring is required to operate the valves in sequence.

Referring now more particularly to FIGS. 10 through 14, FIG. 10 illustrates the machine in the down position with the flask 42 in position for flask pick up. A pattern P and pattern plate 230, which will close the bottom of the flask 42 when assembled therewith, have been placed upon the table 15. The cycle of the machine is now started by the operator manually energizing the table raise valve 182 which permits a flow of live air from source 200 through directional valve 209 pressurizing the top of reservoir 69 and forcing oil through normally opened master control valve 73. The flow of oil through the lines 81, 72 and 74 to the bottom of the squeeze piston 9 will cause the squeeze piston to move upwardly and thus the table 15 and pick up the flask 42 from the pins 40. As the table rises, the jolt height control valve 146 is mechanically energized in response to the vertical position of the table sending an impulse of air from pressure line 203 to the pressure action valve 219 which in turn sends an impulse of air to the pilot line 220 of three-way valve 214. Pressurization of the pilot line 220 also resets the table raise valve 182 initially manually energized by the operator to obtain vertical movement of the table.

The three-way valve 214 now shifts and permits live air to flow from line 215 to the port 120 of the master control valve 73 causing it to shift to the lock position wherein the land 111 will block the passage 92. Air pressure in line 215 and the position of valve 214 will cause the master control valve to remain in this position.

The machine has now achieved the relative position of the parts shown in FIG. 11 wherein the table has been elevated to assemble the flask 42, pattern P and pattern plate 230 and the squeeze piston 9 is now supported on a body of oil 231 in the cylindrical cavity 8. Since the master control valve 73 is in its locked position, the volume of this body of oil 231 will remain constant and the table is thus locked in its elevated jolt position. Sand S will now be dumped into the assembled mold box from overhead hopper 232 seen in FIG. 1.

The operator now manually energizes the jolt valve 181 to supply air under pressure from source line 203 to the inlet 175 in the table. Air pressure will now enter the cavity in the squeeze piston 9 beneath the jolt piston 19 and the table, pattern plate, flask and sand therein are jolted and such jolting operation may continue at the discretion of the operator. After the required number of jolts, the jolt valve is manually deenergized and the flask is struck off.

After the jolting operation is completed as seen in FIG. 12, the squeeze head 50 supporting therebeneath squeeze board 233 is then swung into place directly above the flask. Once in position, as seen in FIG. 13, the squeeze valve 186 is manually energized pressurizing lines 212 and 213 permitting a flow of air to shift the three-way valve 214 which has been holding the master control valve 73 in a locked position. Once the valve 214 is shifted, the master control valve is then free to shift to the neutral or spring centered open position shown more clearly in FIG. 6. At the same time, a flow of air is also directed through the directional valve 209 to the top of reservoir 69 forcing oil through the control valve to continue the upward travel of the squeeze piston.

The table 15 continues to travel upwardly until the sand S engages the squeeze board 233 and a resistance is encountered. At this time, the spring pressure holding the sequence valve 224 closed is overcome, and a flow of air is permitted to drive the piston 62 of the air operated intensifier unit 60 downwardly thereby tending to reduce the volume of the oil supporting the flask and thus increasing the pressure thereof. This air applied high oil pressure will then effectively ram the sand S between the squeeze head board 233 and the pattern P and plate 230 to make a foundry mold of the desired hardness. For example, the oil pressure booster unit 60 may obtain a maximum oil pressure of 22,000 pounds per square inch.

When the squeeze valve was energized, the pilot operated check valve portion of the master control valve 73 was also deenergized so that the valve head 97 will serve as a check lock during the intensified oil pressure squeeze so that oil cannot flow back to the chamber 69 during such high pressure squeeze. FIG. 13 illustrates the mold being squeezed against the squeeze board 233.

When the squeeze valve 186 is released, a spring returns the valve to its original position and this permits air then to drive the intensifier upwardly to its original position by pressurizing the port 79. This also repressurizes the pilot line to the check valve portion of the main valve 73 to permit the oil to flow back through such valve to the tank. The table 15 now descends rapidly until the slow draw control valve 122 is mechanically shifted in response to a particular height of the table. At this time, air is permitted to flow through line 204, through valve 205 to pressurize pilot line 206 to operate the vibrator 34 and to pressurize port 119 of the master control valve 73 to shift the land 110 into position partially blocking the passage 92 with the spool being against the adjustable stop screw 116. A restriction in the valve 73 is thus formed causing the table to descend at a slower rate of draw. The table will continue to descend at this slow rate until the flask has engaged the top of the support or draw pins 40 and the pattern P has broken away from the now formed sand mold.

As the table 15 continues downwardly as seen in FIG. 14, the slow draw control valve 122 is again ported venting line 206 which in turn permits the master control valve 73 to return to its normal spring centered or open position. This now permits the table and squeeze piston to descend at its normal faster rate until it reaches its full down position as indicated in FIG. 14. The pattern P has now been drawn from the mold and the squeeze head 50 is manually returned to its laterally out-of-the-way position and the operator may now remove the completed mold. An empty flask is again placed on the pins and the machine is ready for a repeat of the above-described cycle.

It can now be seen that there is provided a highly simplified smaller capacity, manually operated foundry molding machine which incorporates a hydraulic piston-cylinder assembly which will assemble a pattern, pattern plate and flask on the up stroke of such assembly, lock such assembled mold box in position to be filled with sand and subsequently jolted, continue upward movement of the jolted sand filled mold box mechanically to squeeze the sand therein against a squeeze head, and on the down stroke to draw the pattern from the sand mold thus produced. The jolt mechanism is thus elevated with the table and such jolting operation is accomplished at a vertically elevated position thereof to avoid the necessity of more than one complete stroke of the squeeze piston. Moreover, an extremely high hydraulic squeeze pressure is obtained through a relatively simplified assortment of control valves which may be incorporated in the machine itself to produce a highly compact and efficient manually operated machine.

Other modes of applying the principle of the invention may be employed, change being made as regards the details described, provided the features stated in any of the following claims or the equivalent of such be employed.

I, therefore, particularly point out and distinctly claim as my invention:

1. A foundry molding machine comprising a table frame, a table, a hydraulic piston-cylinder assembly carried by said frame supporting said table for vertical movement, a squeeze head frame adjacent said table frame and secured thereto, a squeeze head carried by said squeeze head frame, means mounting said squeeze head for movement to and from a position directly above said table whereby a pattern containing flask may be positioned on said table, filled with sand and then elevated by said table against said squeeze head when such is positioned directly above said table, hydraulic fluid pressure means in said squeeze head frame connected to said piston-cylinder assembly operative to raise and lower said table, a hydraulic fluid pressure intensifier in said squeeze head frame connected to said piston-cylinder assembly operative to increase the hydraulic fluid pressure supporting said table as the sand in such flask engages said squeeze head, a master control valve between said hydraulic fluid pressure means and said intensifier including an air pressure opened check valve, and means operative to vent such air pressure holding said check valve open thereby to close the same prior to energization of said intensifier.

2. A foundry molding machine as set forth in claim 1 wherein said master control valve is operatively connected to said piston-cylinder assembly and includes a valve member operative to block fluid flow therethrough, restrict fluid flow therethrough, or permit full fluid flow therethrough.

3. A foundry molding machine as set forth in claim 2 including means responsive to the vertical height of said table operative to shift said valve member to block fluid flow therethrough.

4. A foundry molding machine as set forth in claim 3 wherein said last mentioned means comprises an air valve including a vertically elongated valve member connected to said table.

5. A foundry molding machine as set forth in claim 2 including means responsive to the vertical height of said table when said table is being lowered operative to shift said valve member partially to block fluid flow therethrough.

6. A foundry molding machine as set forth in claim 5 wherein said last mentioned means comprises an air valve having a vertically elongated valve member connected to said table.

7. A foundry molding machine comprising a frame, a table, a hydraulic piston-cylinder assembly carried by said frame supporting said table for vertical movement, a squeeze head carried by said frame, means mounting said squeeze head for movement to and from a position directly above said table whereby a pattern containing flask may be positioned on said table, filled with sand and then elevated by said table against said squeeze head when such is positioned directly above said table, hydraulic fluid pressure means in said frame connected to said piston-cylinder assembly operative to raise and lower said table, a hydraulic fluid pressure intensifier in said frame connected to said piston-cylinder assembly operative to increase the hydraulic fluid pressure supporting said table as the sand in such flask engages said squeeze head, an air pressure opened check valve between said hydraulic fluid pressure means and said intensifier, and means operative to vent said check valve to close the same prior to energization of said intensifier.

8. A foundry molding machine as set forth in claim 7 including a master control valve operatively connected to said piston-cylinder assembly between said hydraulic fluid pressure means and said intensifier, said master control valve including a valve member operative in response to shifting thereof partially to block fluid flow therethrough, completely to block fluid flow therethrough, or fully to open fluid flow therethrough.

9. A foundry molding machine as set forth in claim 8 including means responsive to the height of said table to shift said valve member when said table is being lowered partially to block fluid flow through said master control valve.

10. A foundry molding machine as set forth in claim 9 wherein said last mentioned means comprises an air valve including a vertically elongated valve member connected to said table.

11. A foundry molding machine as set forth in claim 7 wherein said hydraulic fluid pressure means comprises a hydraulic fluid reservoir having an air pressure port at the top thereof, and means to pressurize and vent the top of said reservoir to raise and lower said table, respectively.

12. A foundry molding machine as set forth in claim 7 wherein said intensifier comprises an air operated ram operative to tend to reduce the volume of hydraulic fluid supporting said table thus to increase the pressure of such fluid, and an air pressure operated sequence valve operative in response to a predetermined air pressure thereon to energize said intensifier.

13. A foundry molding machine as set forth in claim 7 wherein said fluid pressure means comprises an annular hydraulic fluid reservoir having an air pressure port at the top thereof, means operative to pressurize and vent said port thus to raise and lower said table, and an axial fluid passageway extending through said reservoir connecting said intensifier and said piston-cylinder assembly.

14. A foundry molding machine comprising a table, an oil piston-cylinder assembly supporting said table for vertical movement, said table being adapted to support an open top sand filled mold box, a squeeze head, oil pressure means operative to move said table and thus the sand within such box against said head, an oil pressure intensifier, and means responsive to increased resistance to movement of said table operative to energize said intensifier to obtain a high pressure sand squeeze, said oil pressure means comprising an annular air-over-oil reservoir, and an axial oil passage through said reservoir connecting said intensifier and said oil piston-cylinder assembly.

15. A foundry molding machine comprising a table, fluid pressure means operative to raise said table to assemble a pattern, pattern plate and flask to form a mold box, means to fill such box with sand, means to increase the volume of fluid supporting such sand filled mold box to move such sand therein against a squeeze head, intensifier means responsive to a predetermined increase in resistance to such increase in volume operative to tend to decrease such volume thereby to increase the pressure of such fluid to obtain a high pressure sand squeeze, and means operative prior to energization of said intensifier means operative to block fluid escape except through elevation of said table.

16. In a foundry molding machine of the type having a vertically movable table adapted to support a pattern containing sand filled flask thereon, a squeeze head thereabove, and power means operative to raise and lower said table to squeeze such sand against said head and to draw the pattern from the mold thus produced; a table height responsive control for said power means comprising a valve having a vertically elongated valve member connected to said table.

17. The combination set forth in claim 16 wherein said power means comprises hydraulic fluid pressure means, a master control valve comprising a pilot operated valve spool, said table height responsive control being an air valve operative to shift said valve spool.

18. In a foundry molding machine of the type having a vertically movable table adapted to support a pattern containing sand filled flask thereon, a squeeze head thereabove, and hydraulic pressure means connected to said table operative to raise and lower said table to squeeze such sand against said head and to draw the pattern from the mold thus produced; a master control valve operatively connected to said table between said hydraulic pressure means and said table comprising a valve member, and means operative to shift said valve member partially to block, completely to block or freely to permit fluid flow therethrough; said valve member comprising a symmetrical valve spool having lands at opposite ends thereof, means operative to spring-center said valve member to permit full fluid flow therethrough, means operative to shift said valve member in one direction completely to block fluid flow therethrough, and means operative to shift said valve member in the opposite direction partially to block fluid flow therethrough.

19. The combination set forth in claim 18 including an adjustable stop screw operative to limit movement of said valve member in said opposite direction.

References Cited by the Examiner

UNITED STATES PATENTS

| | | | |
|---|---|---|---|
| 1,048,692 | 12/1912 | Henderson. | |
| 1,268,768 | 6/1918 | Pitfield | 22—40 |
| 2,817,127 | 12/1957 | Beech | 22—42 |
| 3,169,285 | 2/1965 | Hatch et al. | 22—41 |

FOREIGN PATENTS 180,650  11/1922  Great Britain.

J. SPENCER OVERHOLSER, *Primary Examiner.*

MARCUS U. LYONS, *Examiner.*